(12) United States Patent
Sugiyama

(10) Patent No.: US 8,380,017 B2
(45) Date of Patent: Feb. 19, 2013

(54) OPTICAL WAVEGUIDE DEVICE

(75) Inventor: Masaki Sugiyama, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 381 days.

(21) Appl. No.: 12/801,461

(22) Filed: Jun. 9, 2010

(65) Prior Publication Data

US 2010/0329600 A1 Dec. 30, 2010

(30) Foreign Application Priority Data

Jun. 25, 2009 (JP) .................. 2009-150518

(51) Int. Cl.
*G02F 1/035* (2006.01)
(52) U.S. Cl. ............................. 385/3; 385/2
(58) Field of Classification Search ............. 385/3, 2
See application file for complete search history.

(56) References Cited

U.S. PATENT DOCUMENTS

| | | | |
|---|---|---|---|
| 7,095,926 | B2 | 8/2006 | Sugiyama |
| 7,394,950 | B2 * | 7/2008 | Sugiyama .................. 385/2 |
| 2004/0028418 | A1 | 2/2004 | Kaplan et al. |
| 2008/0044124 | A1 | 2/2008 | Sugiyama |

FOREIGN PATENT DOCUMENTS

| | | |
|---|---|---|
| JP | 03-200924 | 9/1991 |
| JP | 2006-84537 | 3/2006 |
| JP | 2008-46573 | 2/2008 |
| JP | 2008-276145 | 11/2008 |

OTHER PUBLICATIONS

Patent Abstract of Japanese Publication No. 03-200924, published Sep. 2, 1991.
Patent Abstracts of Japan, Publication No. 2008-276145, Published Nov. 13, 2008.
Japanese Patent Office Action issued in Japanese Patent Application No. 2009-150518 dated Jul. 24, 2012.

* cited by examiner

*Primary Examiner* — Omar Rojas
(74) *Attorney, Agent, or Firm* — Staas & Halsey LLP

(57) ABSTRACT

In an optical waveguide device, in a cross direction intersecting an extension direction of waveguide sections, one or more bridge portions of a ground electrode closer to a center of stress distribution of a stress due to a support member, and one or more bridge portions of a ground electrode farther from the center of stress distribution are formed with different shapes. The structure of the ground electrodes is devised so that a stress negating the difference in stress characteristics between the plurality of waveguide sections, generated by the stress applied from the support member to a substrate, is applied from the ground electrode to the substrate.

18 Claims, 12 Drawing Sheets

OPTICAL WAVEGUIDE DEVICE

CROSS-REFERENCE TO RELATED APPLICATION

This application is based upon and claims the benefit of priority of the prior Japanese Patent Application No. 2009-150518, filed on Jun. 25, 2009, the entire contents of which are incorporated herein by reference.

FIELD

The present invention relates to an optical waveguide device that uses an electro-optic effect.

BACKGROUND

Optical waveguide devices used as optical modulators in recent optical communication systems include a substrate having an electro-optic crystal such as $LiTaO_2$ or $LiNbO_3$ (LN). The optical waveguide device can change a refractive index of an optical waveguide formed in the substrate by causing an electric field to act on the optical waveguide. In the optical waveguide device, for example, a Mach-Zehnder (MZ) type structure is well known as an interference structure that uses an optical waveguide formed in an electro-optic crystal substrate. A Mach-Zehnder type optical interference structure that uses the optical waveguide includes an input waveguide section, a waveguide section including two parallel waveguides in which light input to the input waveguide section is branched and propagated, and an output waveguide section that combines the branched light having propagated in the waveguide section. Moreover an electrode that causes an electric field to act on the parallel waveguides in the waveguide section is formed above the substrate via a buffer layer such as $SiO_2$.

As the electrode of the optical waveguide device including the Mach-Zehnder type optical interference structure that uses the optical waveguide, a coplanar electrode provided on the waveguide section in the form of a signal electrode and a ground electrode may be adopted. Furthermore in the case in which the electro-optic crystal substrate is a Z-cut substrate, the signal electrode and the ground electrode are formed respectively so as to have a portion overlapping on the parallel waveguides in the waveguide section. Moreover, the signal electrode and the ground electrode are formed in a configuration of a traveling-wave electrode with one end of the signal electrode being grounded via a resistor and terminated, corresponding to higher frequencies of signal light to be modulated. For example, a microwave high-frequency electric signal is applied to the other end of the signal electrode in the form of the traveling-wave electrode.

A Mach-Zehnder type optical modulator that uses the optical waveguide adopts a structure in which many waveguide sections are integrated on a single substrate, corresponding to diversification of an optical modulation system, such as for example, Return-to-Zero (RZ) modulation, multilevel modulation, and polarization multiplexing modulation. As one example, FIG. 10 illustrates an optical waveguide device in which four waveguide sections are formed in a substrate.

In FIG. 10, an optical waveguide device 1 includes an optical waveguide 3 extending in a length direction of an LN substrate 2. The optical waveguide 3 is formed in the Z-cut LN substrate 2 by a process of patterning and thermally diffusing a metal film such as Ti, or by a process of subjecting the metal film to proton exchange in benzoic acid after patterning. The optical waveguide 3 includes three parts, that is; an input waveguide section 3a for inputting light, four waveguide sections 3b for branching and propagating light input to the input waveguide section 3a, and an output waveguide section 3c for combining the branched lights having propagated in the waveguide section 3b. That is, the four waveguide sections 3b are connected in parallel between the input waveguide section 3a formed at one end of the LN substrate 2 and the output waveguide section 3c formed at the other end of the LN substrate 2.

In the four waveguide sections 3b, each of the waveguide sections 3b are formed by two parallel waveguides. Moreover a signal electrode 4 and a ground electrode 5 for causing an electric field to act, are provided for each waveguide section 3b, with a buffer layer 2a interposed therebetween (refer to FIG. 11). As illustrated in FIG. 10, the ground electrode 5 is formed wider than the signal electrode 4 in a cross direction D2 intersecting an extension direction D1 of the waveguide section 3b, in order to obtain excellent high frequency characteristics.

The ground electrode 5 illustrated in FIG. 10 has a portion divided into a narrow portion 5a having a narrow electrode width and a wide portion 5b having a wide electrode width in the cross direction D2, and the narrow portion 5a overlaps on one of the waveguides of the waveguide section 3b. The narrow portion 5a and the wide portion 5b are connected to each other by bridge portions 5c provided at a predetermined pitch in the extension direction D1. The reason why the ground electrode 5 is divided in the cross direction D2 as illustrated in FIG. 10 is to suppress a stress applied to the waveguide section 3b under the ground electrode 5 resulting from a difference in thermal expansion between the ground electrode 5 and the LN substrate 2.

When a stress is applied to the waveguide section 3b due to the difference in thermal expansion, it affects the refractive index of the optical waveguide at a portion where the stress is applied, and a variation occurs in a voltage that turns off an output light output from the output waveguide section 3c. With respect to this voltage variation, a control is effective that separately applies a bias voltage (DC) to the electrode, and adjusts the bias voltage while monitoring the output light, to thereby optimize an operating point of the optical modulator. However in this case there is a problem in that the drive voltage increases. To solve this problem, a portion positioned on the waveguide section 3b is made the narrow portion 5a by dividing the wide ground electrode 5, to weaken the stress applied to the optical waveguide, thereby suppressing operating point variations due to temperature fluctuations as much as possible. On the other hand, with regard to the high frequency characteristics of the electrode, the bridge portion 5c is formed to connect the narrow portion 5a and the wide portion 5b to ensure a sufficient grounded state, thereby maintaining the high frequency characteristics. Japanese Unexamined Patent Publication No. 2006-084537 (Patent Document 1) discloses the configuration of dividing the ground electrode.

The ground-electrode dividing structure disclosed in Patent Document 1 is for equalizing the stress due to the electrode in the cross direction intersecting the extension direction of the waveguide section, by reducing the stress applied to the optical waveguide from the wide ground electrode down to a similar level to the stress due to the thin signal electrode. However as illustrated in FIG. 10, the LN substrate 2 of the optical waveguide device 1 is supported by a support member 6 in a casing in which the optical waveguide device 1 is installed. Therefore, there is a stress applied to the lower surface of the LN substrate 2 from the support member 6, other than the stress applied to the upper surface of the LN substrate 2 from the ground electrode 5. The support member 6 is a part of the casing or a part separate from the casing, and is made of metal such as SUS, and there is a difference in thermal expansion between the LN substrate 2 and the support member 6. Because the LN substrate 2 is fixed to the support member 6 by using an adhesive or the like, the LN substrate 2 also receives a stress from the lower surface of the substrate due to the difference in thermal expansion between the LN substrate 2 and the support member 6. The stress applied by the support member 6 from the lower surface of the LN substrate 2 changes in magnitude in the cross direction D2. The stress applied by the support member 6 with respect to the four parallel waveguides 3b arranged in the width direction of the LN substrate 2 in FIG. 10 will be explained with reference to FIG. 11.

FIG. 11 is a cross-section along line A-A in FIG. 10, of the optical waveguide device 1 fixed to the support member 6. The coefficient of thermal expansion of the support member 6 is smaller than that of the LN substrate 2, and the stress applied from the support member 6 to the LN substrate 2 due to a difference in thermal expansion attributable to the difference in coefficient of thermal expansion, becomes stronger with approach to the sides of the LN substrate 2. Consequently, when as illustrated in FIG. 10 and FIG. 11, the four waveguide sections 3b are arranged in the LN substrate 2 substantially symmetrically in the width direction of the substrate to equalize the stress due to the electrodes 4 and 5 in the width direction of the substrate, as shown in FIG. 11, the distribution of the stress applied from the support member 6 to the LN substrate 2 in the cross direction D2 exhibits characteristics such that the distribution center substantially coincides with the widthwise center of the substrate and the stress distribution becomes gradually stronger from the center of stress distribution toward the sides of the substrate.

Attributable to the stress due to the support member 6 illustrated in FIG. 11, with regard to two waveguide sections 3b-in of the four waveguide sections 3b, that are closer to the center of stress distribution, a stress difference X generated between each of the two waveguides constituting the waveguide sections 3b-in becomes small. On the other hand, with regard to two waveguide sections 3b-out farther from the center of stress distribution, a stress difference Y generated between each of the two waveguides constituting the waveguide sections 3b-out becomes large. That is, in the cross direction D2, a difference in stress characteristics occurs between the plurality of waveguide sections 3b. When a stress difference generated between two waveguides increases in one waveguide section 3b, the operating point variation due to temperature fluctuation increases. Therefore a difference occurs in the operating point variation corresponding to the position in the substrate where the waveguide section 3b is formed.

FIG. 12 illustrates operating point variation due to the position in the substrate of the waveguide section 3b illustrated in FIG. 11. In FIG. 12, the Y axis shows voltage variation (V) of the operating point accompanying a temperature fluctuation, with an operating point voltage in the normal state designated as "1". Moreover, the X axis shows distance (μm) from the widthwise center of the substrate. In the case of FIG. 11, because the widthwise center of the substrate substantially coincides with the center of stress distribution as described above, the widthwise center of the substrate on the X axis in FIG. 12 is the center of stress distribution.

The respective points in FIG. 12 are obtained by plotting variation in operating point voltage in the four waveguide sections 3b at the time of changing the temperature, corresponding to distance on the X axis. As illustrated in FIG. 12, in the waveguide sections 3b-in closer to the center of stress distribution in the cross direction D2, the operating point voltage varies only by about 1V in absolute value, due to temperature fluctuations. On the other hand, in the waveguide sections 3b-out farther from the center of stress distribution in the cross direction D2, the operating point voltage varies by about 3V in absolute value, due to temperature fluctuations. The reason why the sign (±) of the operating point variations is different between the left and right positions is due to whether the ground electrode 5 is provided with respect to the inside waveguide or with respect to the outside waveguide, of the two waveguides, in one waveguide section 3b.

To prevent such a difference in the operating point variation corresponding to the position of the waveguide section in the substrate, there may be considered a method of enlarging the width of the LN substrate 2, or narrowing down a mutual interval between the waveguide sections 3b. However, if the substrate width is enlarged, there is a problem in that the number of substrates that can be cut out from a wafer decreases. Moreover if the mutual interval is narrowed down there is a problem in that crosstalk increases. Therefore, currently there is no satisfactory solution.

SUMMARY

An optical waveguide device proposed to address the above-described problems, is one where the structure of the ground electrode is devised so that a stress negating the difference in stress characteristics between the plurality of waveguide sections caused by the stress applied from the support member to the substrate, can be applied from a ground electrode to the substrate.

The optical waveguide device according to the present proposal includes: a substrate having an electro-optic effect, which is placed above a support member; an optical waveguide formed in the substrate, extending in a length direction of the substrate; and an electrode formed above the substrate for causing an electric field to act on the optical waveguide.

The optical waveguide has; at least one input waveguide section into which light is input, two or more waveguide sections each including a pair of waveguides in which light input to the input waveguide section is branched and propagated, and at least one output waveguide section that combines the branched light having propagated in the waveguide sections.

The electrode includes, for each of the waveguide sections, a signal electrode having a portion overlapping on one of the pair of waveguides, and a ground electrode having a portion overlapping on the other of the pair of waveguides.

The ground electrode has a portion divided into a narrow portion overlapping on the waveguide and a wide portion having a wider width than the narrow portion, in a cross direction intersecting an extension direction of the waveguide sections, and the narrow portion and the wide portion are connected by one or more bridge portions.

A shape of the one or more bridge portions of the ground electrode are different between a plurality of the ground electrodes.

Alternatively, the optical waveguide device according to the present proposal includes: a substrate having an electro-optic effect, which is placed above a support member; an optical waveguide formed in the substrate, extending in a length direction of the substrate; a traveling-wave electrode formed above the substrate for causing an electric field due to a high-frequency electric signal to act on the optical waveguide; and an operating-point adjusting electrode formed above the substrate, to which a bias voltage for adjusting an operating point of the optical waveguide is applied.

The optical waveguide has; at least one input waveguide section into which light is input, two or more waveguide sections each including a pair of waveguides in which light input to the input waveguide section is branched and propagated, and at least one output waveguide section that combines the branched light having propagated in the waveguide sections.

The operating-point adjusting electrode includes, for each of the waveguide sections, a bias electrode having a portion overlapping on one of the pair of waveguides, and a ground electrode having a portion overlapping on the other of the pair of waveguides.

The ground electrode has a portion divided into a narrow portion overlapping on the waveguide and a wide portion having a wider width than the narrow portion, in a cross direction intersecting an extension direction of the waveguide section, and the narrow portion and the wide portion are connected by one or more bridge portions.

A shape of the one or more bridge portions of the ground electrode is different between a plurality of the ground electrodes.

The object and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

DESCRIPTION OF EMBODIMENTS

Figure 1:
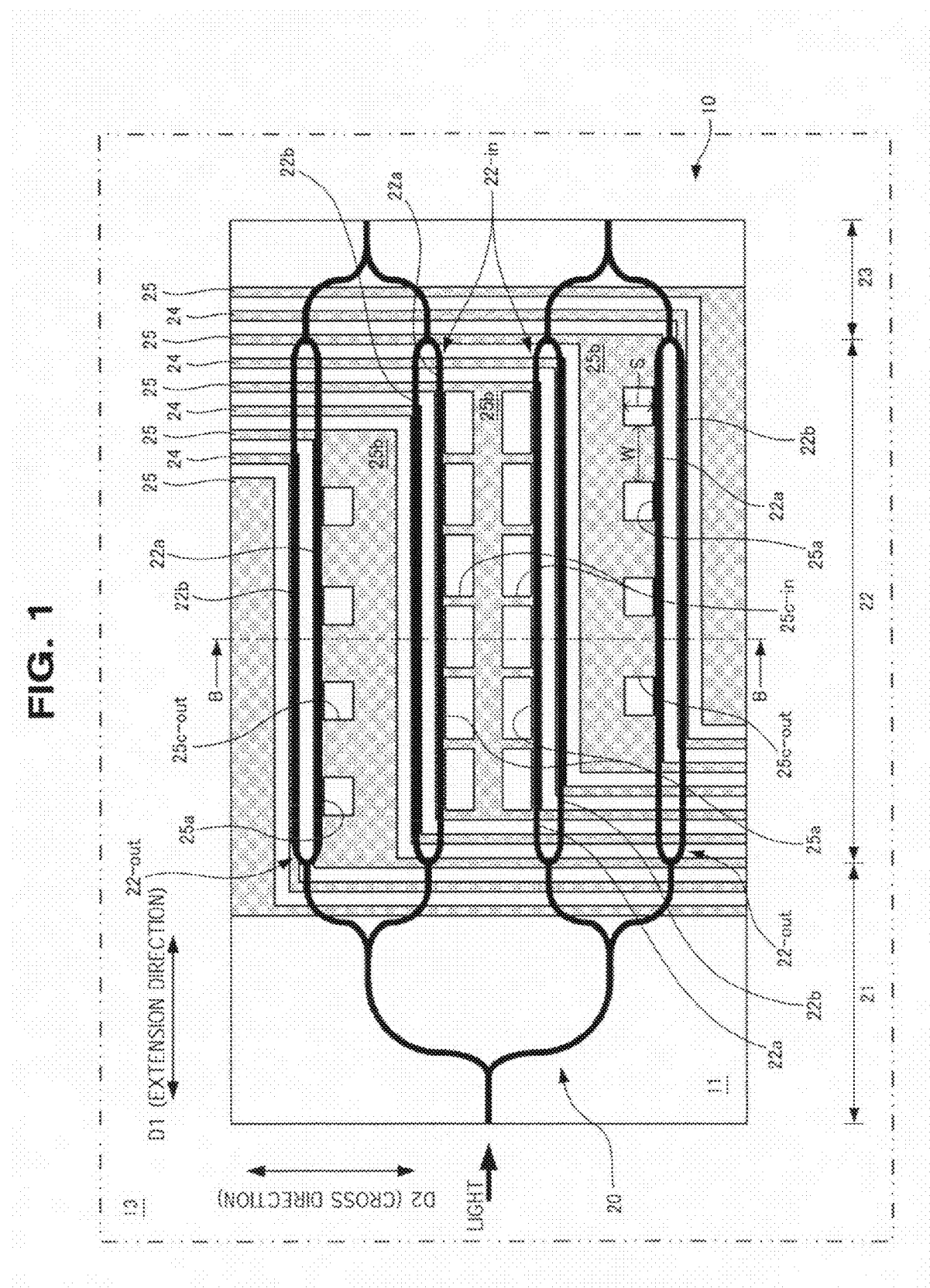
FIG. 1 is a plan view illustrating a first embodiment of an optical waveguide device.
Figure 2:
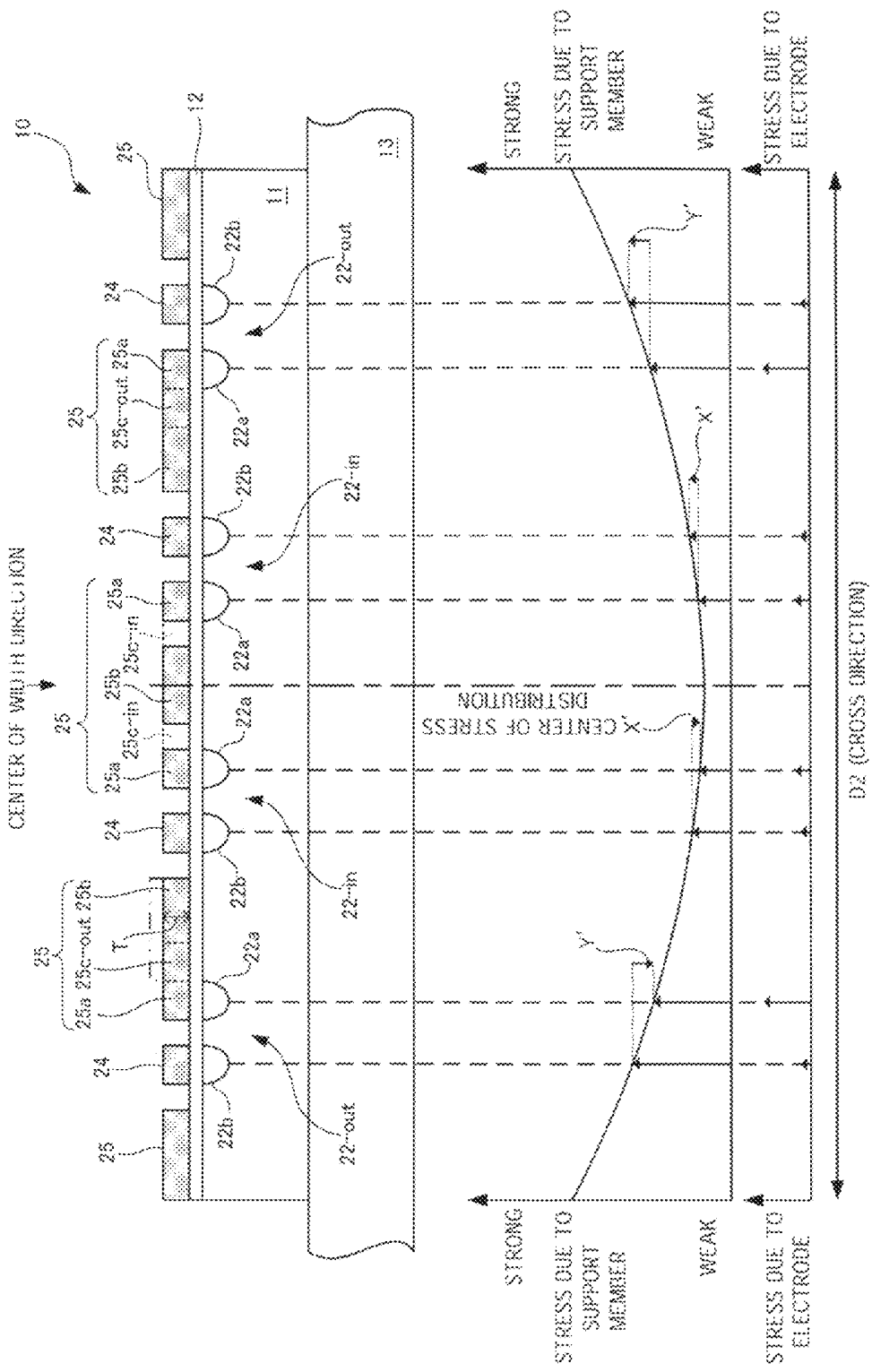
FIG. 2 is a cross-section along line B-B in FIG. 1.

FIG. 1 is a plan view illustrating a first embodiment of an optical waveguide device. FIG. 2 is a cross-section along line B-B in FIG. 1. In FIG. 1 and FIG. 2, an optical waveguide device 10 includes a Z-cut substrate 11 which includes LiNbO$_3$ (LN) as a substrate having an electro-optic effect, and an optical waveguide 20 extending in a length direction (longitudinal direction) of the LN substrate 11 is formed on the LN substrate 11. The optical waveguide 20 is formed by a process of patterning and thermally diffusing a metal film such as Ti, or by a process of subjecting the metal film to proton exchange in benzoic acid after patterning.

The optical waveguide 20 includes; three parts sequentially along an extension direction D1, that is, an input waveguide section 21 into which light is input, four waveguide sections 22 as one example, in which light input to the input waveguide section 21 is branched and propagated, and an output waveguide section 23 that combines the branched light having propagated in the waveguide sections 22. As illustrated in FIG. 1, the four waveguide sections 22 are connected in parallel between the input waveguide section 21 formed on one end of the LN substrate 11 and the output waveguide section 23 formed on the other end of the LN substrate 11.

In the four waveguide sections 22, each of the waveguide sections 22 have a pair of waveguides 22a and 22b. Moreover a signal electrode 24 and a ground electrode 25 for causing an electric field to act on the waveguides 22a and 22b, are provided for each waveguide section 22 in the LN substrate 11, with a buffer layer 12 interposed therebetween (refer to FIG. 2). As illustrated in FIG. 1, the ground electrode 25 is formed wider than the signal electrode 24 in a cross direction D2 intersecting an extension direction D1 of the waveguide section 22, in order to obtain excellent high frequency characteristics.

The ground electrode 25 in the first embodiment has a portion divided into a narrow portion 25a having a narrow electrode width and a wide portion 25b having a wide electrode width in the cross direction D2. Moreover the narrow portion 25a overlaps on the waveguide 22a, of the two waveguides 22a and 22b in the waveguide section 22, on the side that is closer to a center of stress distribution illustrated in FIG. 2. The reason why the ground electrode 25 is divided in the cross direction is to prevent a stress from being excessively applied to the waveguide section 22 under the ground electrode 25 due to a difference in thermal expansion between the ground electrode 25 and the LN substrate 11. The divided narrow portion 25a and wide portion 25b are connected by bridge portions 25c provided at a predetermined pitch in the extension direction D1, so that high-frequency response characteristics are not deteriorated by ensuring a sufficiently grounded state.

The ground electrode 25 in which the narrow portion 25a and the wide portion 25b are connected by the bridge portions 25c, is provided on a side closer to the center of stress distribution than the signal electrode 24, for each waveguide section 22. That is, in each of the waveguide sections 22, the ground electrode 25 is formed with respect to the waveguide 22a on the side closer to the center of stress distribution, and the signal electrode 24 is formed with respect to the waveguide 22b on the side farther from the center of stress distribution. Specifically, in the first embodiment, the ground electrode 25 with respect to the waveguide sections 22-in close to the center of stress distribution (that is, on the inside) is formed in a widthwise central portion of the LN substrate 11 as one ground electrode common to the two waveguide sections 22-in.

In the optical waveguide device 10 illustrated in FIG. 1 and FIG. 2, the bridge portions 25c-in of the ground electrode 25 with respect to the waveguide section 22-in closer to the center of stress distribution, and the bridge portions 25c-out of the ground electrode with respect to the waveguide section 22-out farther from the center of stress distribution are formed in mutually different shapes. That is, the shape of the bridge portions 25c in the each ground electrode 25 is different between the ground electrodes 25, corresponding to the distance from the center of stress distribution. Particularly, in the first embodiment illustrated in FIG. 1 and FIG. 2, the size (width and thickness) of the bridge portion 25c-out in the ground electrode 25 farther from the center of stress distribution (hereinafter, also referred to as "far-side") is thicker than that of the bridge portion 25c-in in the ground electrode 25 closer to the center of stress distribution (hereinafter, also referred to as "near-side"). A difference in thermal expansion between the far-side ground electrode 25 and the LN substrate 11 becomes large, because the far-side bridge portion 25c-out is thicker than the near-side bridge portion 25c-in.

Specifically, in the first embodiment, a width W (that is, in this case, the length in the extension direction D1) of the far-side bridge portion 25c-out is formed wider than that of the near-side bridge portion 25c-in. As a result, the far-side ground electrode 25 can apply a stronger stress to the waveguide 22a than the near-side ground electrode 25 due to a difference in thermal expansion at the time of temperature fluctuation.

FIG. 2 is a cross-section along line B-B in FIG. 1. As illustrated in FIG. 2, the optical waveguide device 10 is placed with the lower surface thereof being fixed to a support member 13. The support member 13 is a part of a casing in which the optical waveguide device 10 is installed, or a part separate from the casing, and is made of metal such as stainless steel (SUS), having a smaller coefficient of thermal expansion than that of the LN substrate 11. Therefore a difference in thermal expansion attributable to the coefficient of thermal expansion is generated between the LN substrate 11 and the support member 13 corresponding to temperature fluctuations. The stress applied from the support member 13 to the LN substrate 11 due to the difference in thermal expansion becomes stronger with approach to the sides of the LN substrate 11. Consequently, when as illustrated in FIGS. 1 and 2, the four waveguide sections 22 are arranged substantially symmetrically in the width direction of the substrate in the LN substrate 11, and corresponding thereto, the electrodes 24 and 25 are also arranged substantially symmetrically in the width direction of the substrate, then as illustrated in FIG. 2, the distribution of the stress applied from the support member 13 to the LN substrate 11 in the cross direction D2 exhibits characteristics such that the distribution center substantially coincides with the widthwise center of the substrate, and the stress distribution becomes gradually stronger from the center of stress distribution toward the sides of the substrate.

Attributable to the stress distribution characteristic due to the support member 13 in the cross direction D2, a difference in stress characteristic is generated between the plurality of waveguide sections 22 in the cross direction D2. That is, due to the stress of the support member 13 illustrated in FIG. 2, with regard to the two waveguide sections 22-in closer to the center of stress distribution, of the four waveguide sections 22, a stress difference X' generated between each of the two waveguides 22a and 22b constituting the waveguide section 22-in is small. On the other hand, with regard to the two waveguide sections 22-out farther from the center of stress distribution, a stress difference Y' generated between each of the two waveguides 22a and 22b constituting the waveguide section 22-out is large.

Regarding the difference in the stress characteristic between the waveguide sections 22, particularly in the far-side waveguide section 22-out in the optical waveguide device 10 of the first embodiment, a stress negating the stress difference Y' generated between the two waveguides 22a and 22b is applied from the ground electrode 25 having the wide bridge portions 25c-out, to the waveguide 22a positioned on the near side to the center of stress distribution. To describe specifically, because the coefficient of thermal expansion of the ground electrode 25 is larger than that of the LN substrate 11, a difference in thermal expansion is generated between the ground electrode 25 and the LN substrate 11 due to temperature fluctuations. In the case of the ground electrode 25 with respect to the near-side waveguide section 22-in, because the width of the bridge portions 25c-in is narrow, an influence of the thermal expansion of the wide portion 25b on the narrow portion 25a is small. Consequently the stress applied from the narrow portion 25a to the waveguide 22a is weak. That is, as described in the aforementioned Patent Document 1, the stress applied to the LN substrate 11 due to the difference in thermal expansion between the ground electrode 25 and the LN substrate 11 is suppressed. On the other hand, in the case of the ground electrode 25 with respect to the far-side waveguide section 22-out, because the width W of the bridge portions 25c-out is wide, an influence of the thermal expansion of the wide portion 25b and the bridge portions 25c-out on the narrow portion 25a is large. As a result, the stress applied from the narrow portion 25a to the waveguide 22a becomes strong.

In the far-side waveguide section 22-out, a stress due to the support member 13 is applied more strongly to the waveguide 22b positioned on the side farther from the center of stress distribution than to the near-side waveguide 22a. Therefore, if a stress equal to the stress difference Y' is applied to the waveguide 22a positioned on the near side, the same level of stress is applied to both waveguides 22a and 22b. If the same level of stress is applied, a change in the refractive index of the two waveguides 22a and 22b becomes the same level. Therefore, as a result, the operating point variation can be suppressed.

Figure 3:
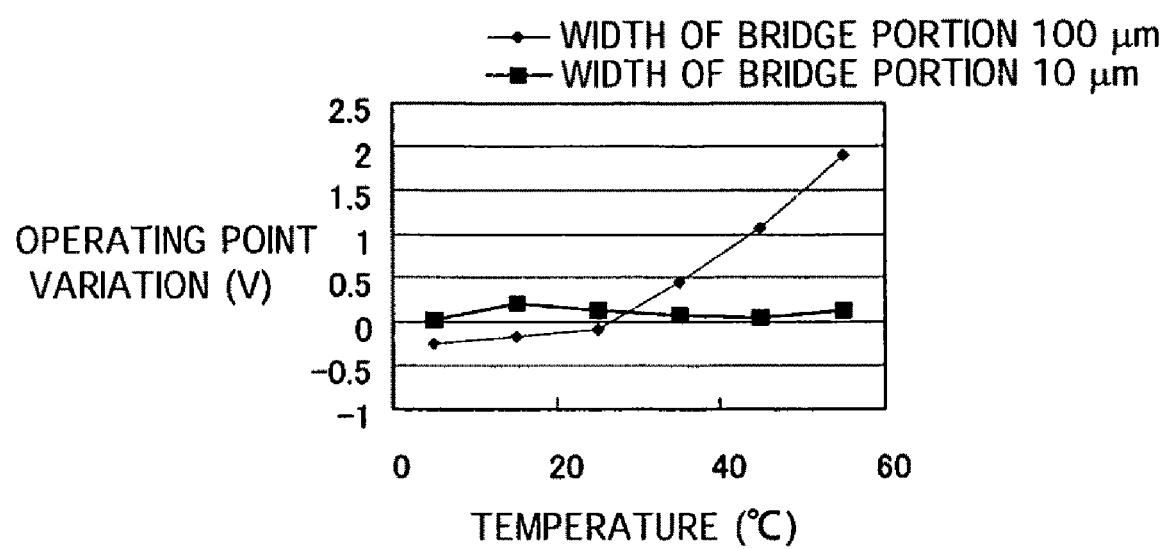
FIG. 3 is a graph illustrating a relation between bridge portion shape and operating point variation.
Figure 12:
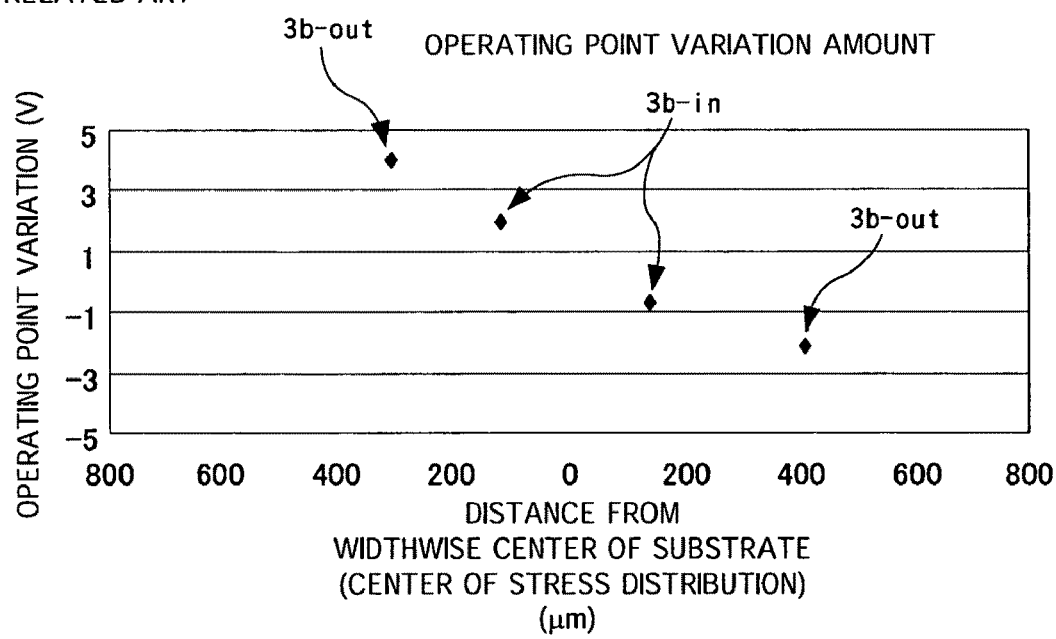
FIG. 12 is a diagram explaining operating point variation corresponding to distance from a center of stress distribution.

FIG. 3 is a graph illustrating one example of the operating point variation corresponding to the width of the bridge portions 25c. Rhombic points correspond to wide bridge portions (100 μm), and square points correspond to narrow bridge portions (10 μm). As illustrated in FIG. 3, it is seen that when the width of the bridge portions 25c is wide, the fluctuation of the operating point voltage becomes large with respect to temperature fluctuations, according to the stress due to thermal expansion of the wide portion 25b and the bridge portions 25c. If the temperature characteristics of the ground electrode illustrated in FIG. 3, and the operating point variation characteristics of the waveguide section according to the position in the substrate where the waveguide section is formed illustrated in FIG. 12 are used, an appropriate shape of the bridge portions 25c-in of the near-side ground electrode 25 and the bridge portions 25c-out of the far-side ground electrode 25 can be designed.

In the abovementioned first embodiment, the structure is such that the width W of the bridge portions 25c is different according to the distance from the center of stress distribution. However, other than this, various structures that can obtain the same action may be considered. For example, a space S between the narrow portion 25a and the wide portion 25b illustrated in FIG. 1 may be made different between the near-side ground electrode 25 and the far-side ground electrode 25. That is, the space S in the far-side ground electrode 25 may be made narrower than the space S in the near-side ground electrode 25. Alternatively, according to circumstances, the structure may be such that the narrow-portion 25a and the wide portion 25b are integrated, with the space S in the far-side ground electrode 25 as zero.

Moreover in another embodiment, as illustrated in FIG. 2, a thickness T of the ground electrode 25 may be made different between the near-side ground electrode 25 and the far-side ground electrode 25. That is, the thickness T of the far-side ground electrode 25 may be made thicker than the thickness T of the near-side ground electrode 25. When the thickness T is changed, if the thickness of the narrow portion 25a is changed, an intrinsic impedance of the electrode is changed. Therefore, in the case in which a shift of the intrinsic impedance due to a change of the thickness is of concern, then as illustrated by the two-dot chain line in FIG. 2, only the thickness T of the wide portion 25b and the bridge portions 25c need be changed.

Figure 4:
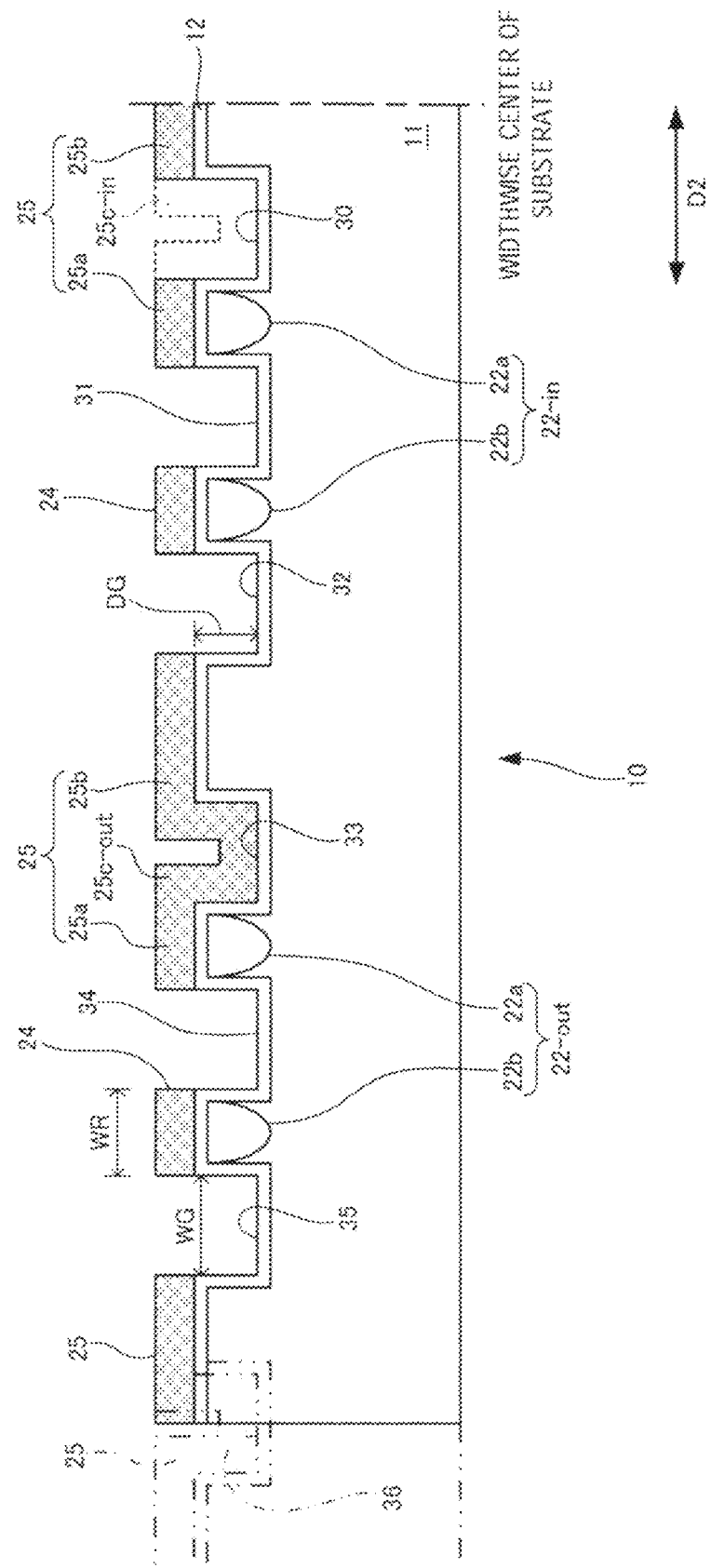
FIG. 4 is a cross-section illustrating a second embodiment of an optical waveguide device.

In addition to devising the structure of the ground electrode 25 itself, an upper surface structure of the LN substrate 11 may also be devised so that the stress applied from the ground electrode 25 to the LN substrate 11 becomes stronger. A second embodiment in which the upper surface structure of the LN substrate 11 is devised is illustrated in FIG. 4. FIG. 4 is a cross-section illustrating a left half portion from the widthwise center of the substrate for an optical waveguide device 10 in the second embodiment.

A substrate 11 is a Z-cut LN substrate as in the first embodiment. Moreover an optical waveguide 20 includes, as in the first embodiment, an input waveguide section 21, four waveguide sections 22 as one example, and an output waveguide section 23. In FIG. 4, of the four waveguide sections 22 connected in parallel between the input waveguide section 21 and the output waveguide section 23, only two waveguide sections on one side from the widthwise center of the LN substrate 11 are illustrated. The portion on the other side from the widthwise center (not shown in the figure) has a structure symmetrical with respect to the portion illustrated in FIG. 4.

In the LN substrate 11 of the second embodiment, grooves 30, 31, 32, 33, 34, and 35 are formed on both sides of each of the two waveguide sections 22a and 22b included in the waveguide section 22. The grooves 30 to 35 are extended along the waveguides 22a and 22b in the extension direction D1 of the waveguide section 22. Consequently the waveguides 22a and 22b of the second embodiment are formed in ridge portions formed by the grooves 30 to 35.

Signal electrodes 24 and ground electrodes 25 are formed above the LN substrate 11 on which the grooves 30 to 35 are formed, via a buffer layer 12. In the waveguide section 22-in on the near side to the center of stress distribution (refer to FIG. 2) and the waveguide section 22-out on the far-side, the signal electrodes 24 are respectively formed above the waveguides 22b positioned on the far side from the center of stress distribution, and the ground electrodes 25 are respectively formed above the waveguides 22a positioned on the near side. The ground electrode 25 includes a portion divided into a narrow portion 25a and a wide portion 25b in the cross direction D2, and the narrow portion 25a is positioned on the waveguide 22a. The signal electrode 24 and the narrow portion 25a positioned on the waveguides 22a and 22b are formed above the ridge portions between the grooves 30 to 35.

The narrow portion 25a and the wide portion 25b of the ground electrode 25 are connected to each other by bridge portions 25c. The planar shape of the bridge portions 25c is the same as that of the bridge portions 25c in the first embodiment, and the bridge portions 25c-in of the near-side ground electrode 25 is formed narrow, and the bridge portions 25c-out of the far-side ground electrode 25 is formed wide. Consequently, as in the first embodiment, a required stress can be applied to the waveguide 22a in the far-side waveguide section 22-out.

In the case of the second embodiment, regarding the stress applied from the ground electrode 25, a structure to which stress can be easily applied is provided by the groove 33 formed on the widthwise inside of the waveguide 22a. That is, because the groove 33 is formed adjacent to the waveguide 22a of the waveguide section 22-out, the ground electrode 25 for the waveguide 22a is formed in a state with the bridge portions 25c-out filling the groove 33. As a result, when the bridge portions 25c-out thermally expands, a force is applied in a direction to expand the groove 33. Therefore a stronger force is applied to the waveguide 22a formed in the ridge portion adjacent to the groove 33. If a groove is formed only for the purpose of applying the stress to the waveguide 22a, then at the very least, only the groove 33 need be provided.

Also in the near-side waveguide section 22-in, the groove 30 is formed adjacent to the waveguide 22a on the side near to the center of stress distribution. However, the width of the bridge portions 25c-in formed in the groove 30 is narrow (refer to the first embodiment). Consequently, the stress applied to the waveguide 22a from the bridge portions 25c-in through the groove 30 is weak as in the first embodiment.

In the case in which the grooves 30 to 35 are formed along the sides of the waveguides 22a and 22b in the LN substrate 11, all of the respective grooves 30 to 35 may also be in the same shape. However, the shape of the grooves 30 to 35 may be different between the near-side waveguide sections 22-in and the far-side waveguide sections 22-out. That is, the shape of the grooves 30 to 35 may be changed corresponding to the formation position of the grooves 30 to 35 in the cross direction D2. For example, a width WG of the groove may be changed (the far-side groove may be made wider), a depth DG of the groove may be changed (the far-side groove may be made deeper), or the length of the groove in the extension direction D1 may be changed (the far-side groove may be made longer). Moreover also a width WR of the ridge portion in the case in which the grooves 30 to 35 are formed, may be made different in shape between the near-side waveguide section 22-in and the far-side waveguide section 22-out (the far-side groove may be made narrower).

Furthermore as for the shape of the ground electrode 25 (bridge portions 25c-in and 25c-out), as in the example explained in the first embodiment, other than changing the shape between the near-side waveguide section 22-in and the far-side waveguide section 22-out, both of the near-side and far-side ground electrodes may be made in the same shape. That is, if the groove 30 is not formed with respect to the waveguide 22a of the waveguide section 22-in, to which a stress need not be applied, and the groove 33 is formed only with respect to the waveguide 22a of the waveguide section 22-out, to which a stress needs to be applied, a different stress can be applied to the near-side waveguide section 22-in and the far-side waveguide section 22-out.

Moreover as illustrated by the two-dot chain line in FIG. 4, taking the symmetric property of the electrodes into consideration, an additional groove 36 may also be formed in relation to the signal electrode 24 for the far-side waveguide section 22-out, so that the ground electrode 25 is symmetrically arranged. That is, if two grooves 34 and 33 are formed inside of the signal electrode 24, two grooves 35 and 36 are also formed outside of the signal electrode 24 so as to be symmetrical with the signal electrode 24 as an axis of symmetry. Furthermore the ground electrode 25 is also formed on the outermost groove 36, to give a structure in which the ground electrodes 25 are symmetrically arranged, with the signal electrode 24 therebetween.

Figure 5:
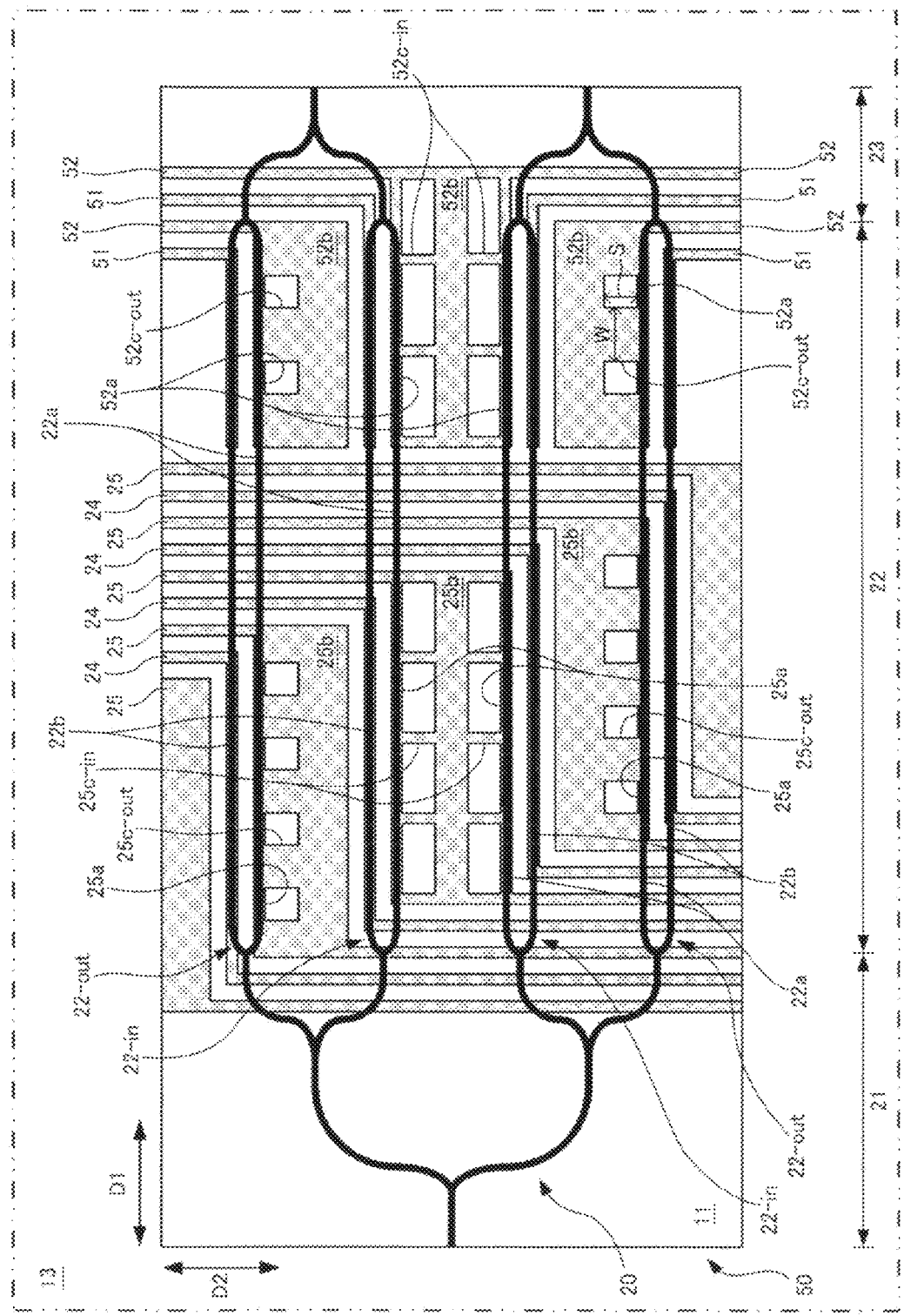
FIG. 5 is a plan view illustrating a third embodiment of an optical waveguide device.

FIG. 5 is a plan view illustrating an optical waveguide device 50 of a third embodiment. In the third embodiment, an operating-point adjusting electrode (DC electrode) is provided separately from a traveling-wave electrode (RF electrode) in order to supply a bias voltage for compensating an operating point variation, to a waveguide section 22. The traveling-wave electrode includes a signal electrode 24 that terminates via a resistor, and a ground electrode 25, as in the first embodiment. Therefore similar parts are denoted by the same reference symbols and duplicate explanation is omitted. Moreover an LN substrate 11 and an optical waveguide 20 formed in the LN substrate 11 are the same as those in the first embodiment. Therefore similar parts are denoted by the same reference symbols and duplicate explanation is omitted.

In the third embodiment, the operating-point adjusting electrode added on the LN substrate 11 includes a bias electrode 51 and a ground electrode 52, and is formed via a buffer layer 12, as with the traveling-wave electrodes 24 and 25 (the signal electrode and the ground electrode). Furthermore in the third embodiment illustrated in FIG. 5, the bias electrode 51 and the ground electrode 52 constituting the operating-point adjusting electrode are provided on the waveguide section 22 in a portion closer to an output waveguide section 23 side than the traveling-wave electrodes 24 and 25.

The bias electrode 51 is formed so as to overlap on a waveguide 22b on the far side from the center of stress distribution in the respective waveguide sections 22, as with the signal electrode 24 in the first embodiment. On the other hand, the ground electrode 52 is also formed so as to have a portion overlapping on a waveguide 22a on the near side to the center of stress distribution in the respective waveguide sections 22, as with the ground electrode 25 in the first embodiment.

The ground electrode 52 has a portion divided into a narrow portion 52a having a narrow electrode width and a wide portion 52b having a wide electrode width, in the cross direction D2. Moreover the narrow portion 52a overlaps on the waveguide 22a. The divided narrow portion 52a and wide portion 52b are connected to each other by bridge portions 52c provided at a predetermined pitch in the extension direction D1. Furthermore particularly, the ground electrode 52 with respect to the near-side waveguide sections 22-in is formed in a widthwise central portion of the LN substrate 11 as one ground electrode common to the two waveguide sections 22-in.

Bridge portions 52c-in of the ground electrode 52 with respect to the near-side waveguide section 22-in and bridge portions 52c-out of the ground electrode 52 with respect to the far-side waveguide section 22-out are formed in mutually different shapes. In the third embodiment, the size of the bridge portions 52c is different corresponding to the distance from the center of stress distribution, and the bridge portions 52c-out in the far-side ground electrode 52 are thicker than the bridge portions 52c-in in the near-side ground electrode 52. Because the bridge portions 52c-out in the far-side ground electrode 52 are thicker than the bridge portions 52c-in in the near-side ground electrode 52, a difference in thermal expansion to the LN substrate 11 increases in the far-side ground electrode 52. Consequently, the ground electrode 52 has the same action as that of the ground electrode 25 in the first embodiment, and can apply a predetermined stress to the waveguide 22a.

FIG. 5 illustrates an example in which a width W of the bridge portions 52c of the ground electrode 52 is changed. However, as in the ground electrode 25 in the first embodiment, a space S between the narrow portion 25a and the wide portion 25b may be made different between the near-side ground electrode 52 and the far-side ground electrode 52, including a case in which the space S is set to zero. Furthermore as another configuration, as in the ground electrode 25 in the first embodiment, the thickness of the ground electrode 52 may also be made different between the near-side ground electrode 52 and the far-side ground electrode 52. Alternatively, only the thickness of the wide portion 52b and the bridge portions 52c may be changed.

Moreover, also in the third embodiment illustrated in FIG. 5, a groove and ridge structure of the LN substrate 11 as described with reference to FIG. 4 may be applied. In the optical waveguide device 50 illustrated in FIG. 5, traveling-wave electrodes 24 and 25 are also illustrated in a shape corresponding to the first embodiment. However, if the bias electrode 51 and the ground electrode 52 constituting the operating-point adjusting electrode have a stress structure corresponding to the first embodiment, the signal electrode 24 and the ground electrode 25 of the traveling-wave electrode need not have the same structure.

Figure 6:
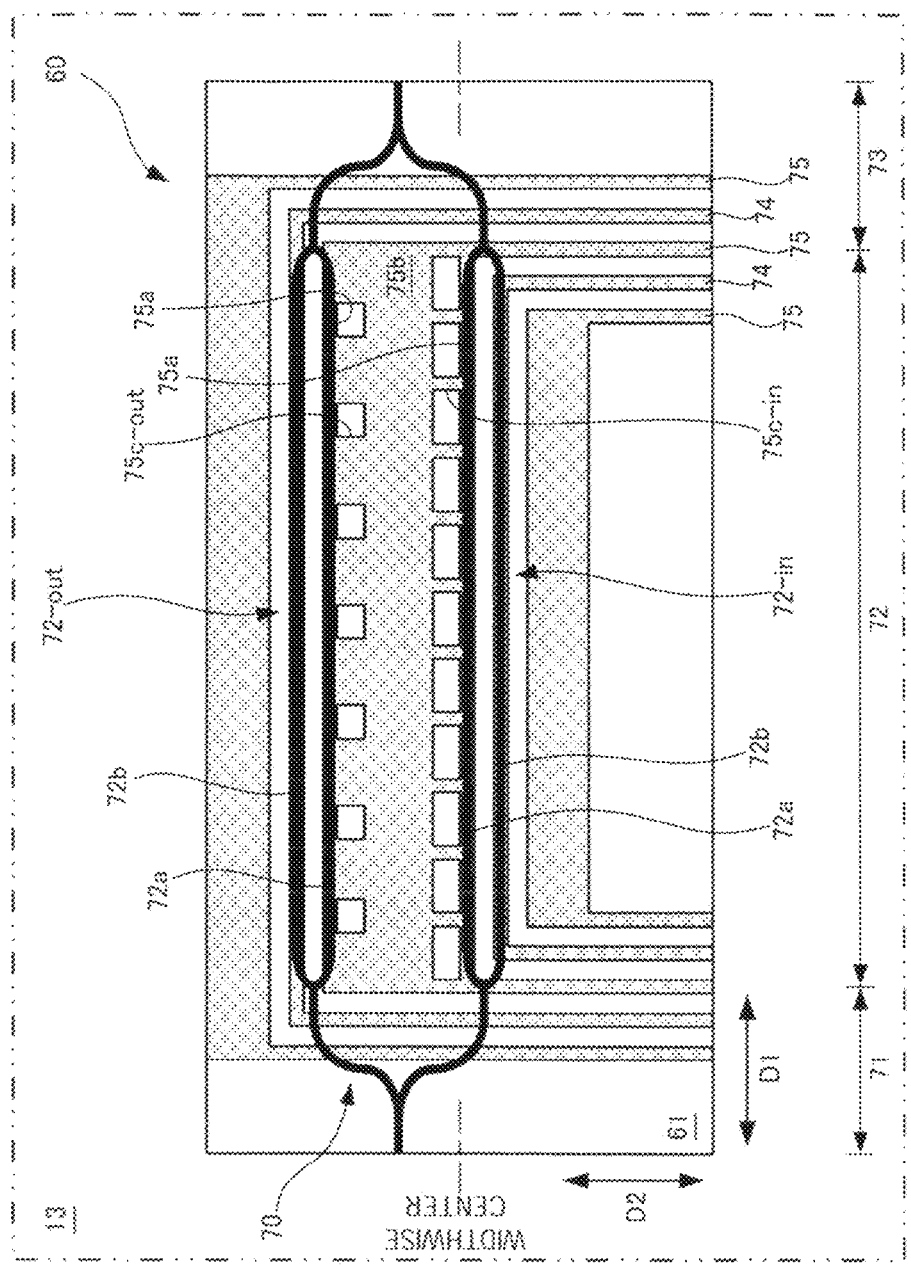
FIG. 6 is a plan view illustrating a fourth embodiment of an optical waveguide device.

FIG. 6 is a plan view illustrating an optical waveguide device 60 of a fourth embodiment. In FIG. 6, a substrate 61 is a Z-cut LN substrate as in the first embodiment, and an optical waveguide 70 extending in the length direction of the LN substrate 61 is formed deviated to one side from the widthwise center of the substrate.

The optical waveguide 70 includes, in order along the extension direction D1, an input waveguide section 71, two waveguide sections 72, and an output waveguide section 73, and the two waveguide sections 72 are connected in parallel between the input waveguide section 71 and the output waveguide section 73. In the two waveguide sections 72, one waveguide section 72-in is formed toward the widthwise center of the LN substrate 61, and the other waveguide section 72-out is formed toward the widthwise outside of the LN substrate 61.

The respective waveguide sections 72 each include a pair of waveguides 72a and 72b. A signal electrode 74 is formed with respect to one waveguide 72b thereof, and a ground electrode 75 is formed with respect to the other waveguide 72a. Both of the signal electrode 74 and the ground electrode 75 are formed above the LN substrate 61 via a buffer layer (refer to the buffer layer 12 in FIG. 2). The ground electrode 75 is formed wider than the signal electrode 74 in the cross direction D2 in order to obtain excellent high frequency characteristics.

In the fourth embodiment, one ground electrode 75 with respect to the waveguide 72a, is provided commonly with respect to the two waveguide sections 72. Consequently the ground electrode 75 illustrated in FIG. 6 has a portion divided into two narrow portions 75a and a wide portion 75b sandwiched between the two narrow portions 75a. The two narrow portions 75a each overlap on the waveguides 72a in the two waveguide sections 72. The divided two narrow portions 75a and the wide portion 75b are connected by bridge portions 75c provided at a predetermined pitch in the extension direction D1, so that high-frequency response characteristics are not deteriorated.

Figure 7:
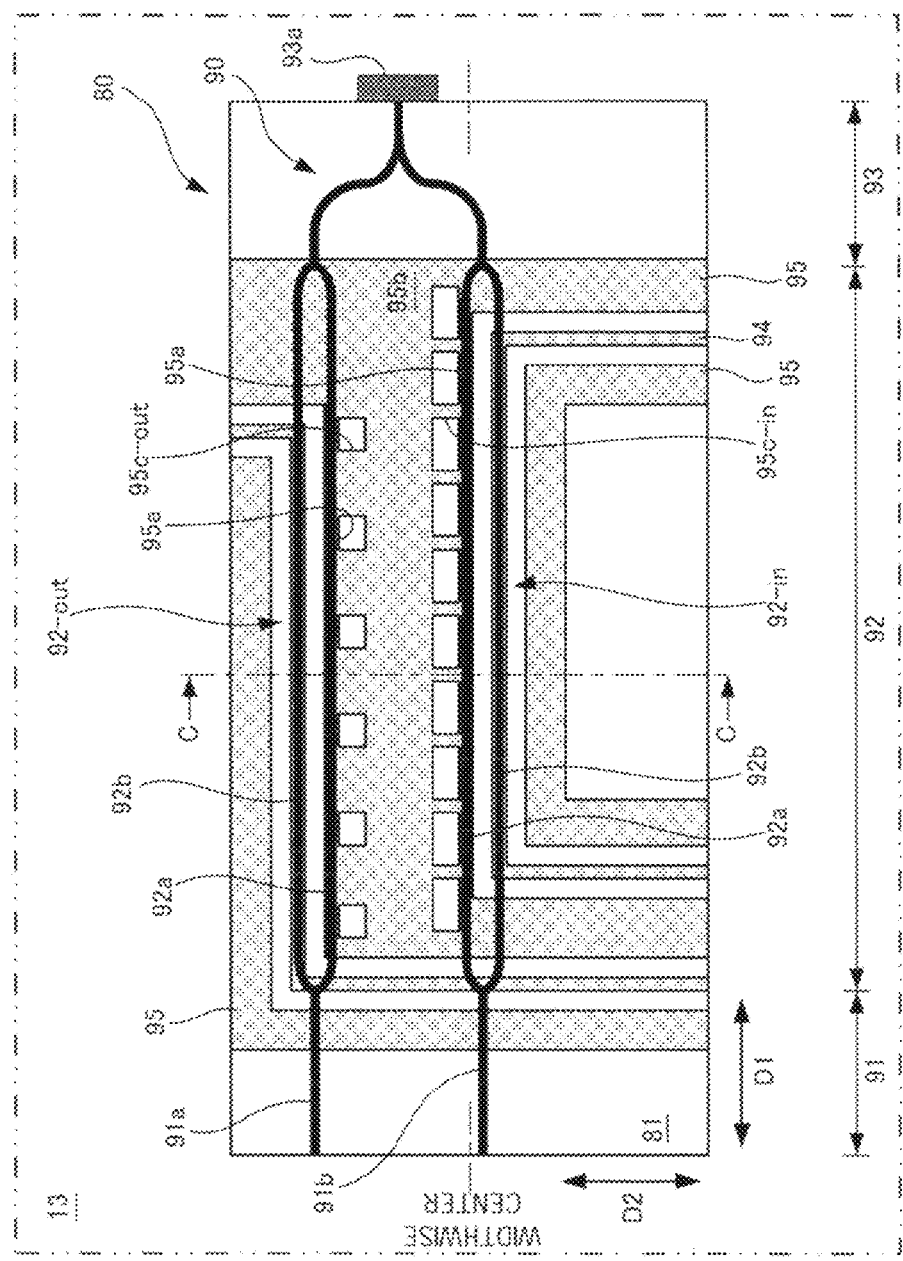
FIG. 7 is a plan view illustrating a fifth embodiment of an optical waveguide device.

FIG. 7 is a plan view illustrating an optical waveguide device 80 of a fifth embodiment in which, as in the fourth embodiment, an optical waveguide 90 extending in the length direction of an LN substrate 81 is formed deviated to one side from the widthwise center of the substrate.

In FIG. 7, the optical waveguide 90 includes, in order along the extension direction D1, an input waveguide section 91, two waveguide sections 92, and an output waveguide section 93, and the two waveguides 92 are connected in parallel between the input waveguide section 91 and the output waveguide section 93. The input waveguide section 91 has two waveguides 91a and 91b extending from an end face of the LN substrate 81, and either one of the waveguides is used as an optical input path. The output waveguide section 93 has a mirror 93a on an end face. The branched light having propagated through one waveguide section 92 is combined, and reflected by the mirror 93a, and returned to the other waveguide section 92. For example, in the input waveguide section 91, in the case in which light is input to the one waveguide 91a, the light input to the waveguide 91a propagates through the waveguide section 92-out to reach the output waveguide section 93, and is reflected by the mirror 93a. The light reflected by the mirror 93a propagates through the waveguide section 92-in, and is emitted from the other waveguide 91b of the input waveguide section 91.

In the two waveguide sections 92, one waveguide section 92-in is formed toward the widthwise center of the LN substrate 81, and the other waveguide section 92-out is formed toward the widthwise outside of the LN substrate 81. The respective waveguide sections 92 each include a pair of waveguides 92a and 92b. A signal electrode 94 is formed with respect to one waveguide 92b thereof, and a ground electrode 95 is formed with respect to the other waveguide 92a. Both of the signal electrode 94 and the ground electrode 95 are formed above the LN substrate 81 via a buffer layer (refer to the buffer layer 12 in FIG. 2). The ground electrode 95 is formed wider than the signal electrode 94 in the cross direction D2 in order to obtain excellent high frequency characteristics.

Also in the fifth embodiment, one ground electrode 95 with respect to the waveguide 92a, is provided commonly with respect to the two waveguide sections 92. Consequently the ground electrode 95 illustrated in FIG. 7 has a portion divided into two narrow portions 95a and a wide portion 95b sandwiched between the two narrow portions 95a. The two narrow portions 95a each overlap on the waveguides 92a in the two waveguide sections 92. The divided two narrow portions 95a and wide portion 95b are connected by bridge portions 95c provided at a predetermined pitch in the extension direction D1, so that so that high-frequency response characteristics are not deteriorated.

Figure 8:
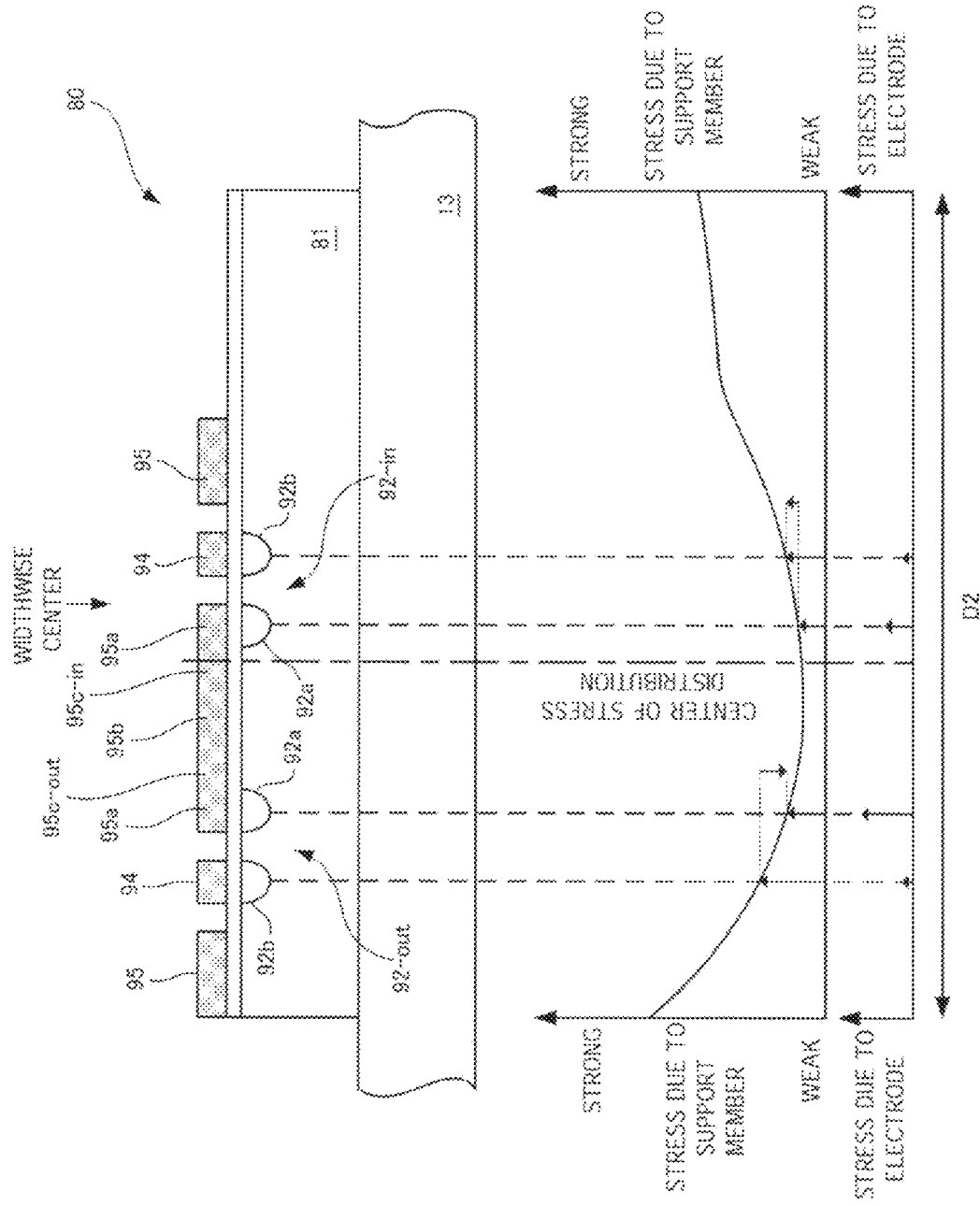
FIG. 8 is a cross-section along line C-C in FIG. 7.

FIG. 8 is a cross-section of the optical waveguide device 80 along line C-C in FIG. 7. The optical waveguide device 60 in the fourth embodiment illustrated in FIG. 6 also has the same shape and stress distribution. Because the optical waveguide 90 in the fifth embodiment is formed deviated to one side from the widthwise center of the substrate, and accompanying this, the electrodes 94 and 95 are also formed deviated to one side of the LN substrate 81, the distribution center of stress due to the support member 13 does not coincide with the widthwise center of the substrate. Even in this case, by changing the shape of the bridge portions 95c corresponding to the distance from the center of stress distribution, the same effect as that of the first embodiment can be obtained.

The stress applied from the support member 13 to the LN substrate 81 due to a difference in thermal expansion generated between the LN substrate 81 and the support member 13, corresponding to temperature fluctuations becomes stronger with approach to the sides of the LN substrate 81. Consequently the stress due to the support member 13 exhibits characteristics such that the stress becomes gradually stronger toward the sides of the substrate. However, because the waveguide sections 92 and the electrodes 94 and 95 are formed deviated to one side of the LN substrate 81, the center of stress distribution is deviated from the widthwise center of the substrate toward the side in which the electrodes 94 and 95 are formed. Even in this case, a difference in stress characteristics occurs between the two waveguide sections 92 in the cross direction D2 attributable to stress distribution characteristics due to the support member 13 in the cross direction D2. That is, due to the stress of the support member 13 illustrated in FIG. 8, in relation to the waveguide section 92-in on the near side to the center of stress distribution, of the two waveguide sections 92, a stress difference generated between the two waveguides 92a and 92b constituting the waveguide section 92-in becomes small. On the other hand, in relation to the waveguide section 92-out on the far side from the center of stress distribution, the stress difference generated between the two waveguides 92a and 92b constituting the waveguide section 92-out becomes large.

In the bridge portions 75c and 95c in the fourth embodiment and the fifth embodiment, the shapes thereof are different between the bridge portions 75c-in and 95c-in that connect the narrow portions 75a and 95a with respect to the near-side waveguide sections 72-in and 92-in, and the bridge portions 75c-out and 95c-out that connect the narrow portions 75a and 95a with respect to the far-side waveguide sections 72-out and 92-out. That is, the width of the far-side bridge portions 75c-out and 95c-out is formed wider than the near-side bridge portions 75c-in and 95c-in, so that a stronger stress can be applied to the waveguides 72a and 92a of the far-side waveguide sections 72-out and 92-out, as in the ground electrode 25 in the first embodiment. Consequently, with regard to a difference in stress characteristics between the two waveguide sections 72 and 92, in the optical waveguide devices 60 and 80 in the fourth embodiment and the fifth embodiment, a stress negating a stress difference generated between the two waveguides 72a and 72b, and 92a and 92b is applied from the ground electrodes 75 and 95 having the wide bridge portions 75c-out and 95c-out to the waveguides 72a and 92a positioned on the near side to the center of stress distribution, particularly in the far-side waveguide sections 72-out and 92-out.

Also in the fourth embodiment and the fifth embodiment, the various modification examples described above are possible. For example, the space between the narrow portions 75a and 95a and the wide portions 75b and 95b may be made different corresponding to the distance from the center of stress distribution, including a case in which the space is made zero. Moreover, the groove and ridge structure of the LN substrate 61 and 81 as described above with reference to FIG. 4 may be applied thereto.

Figure 9:
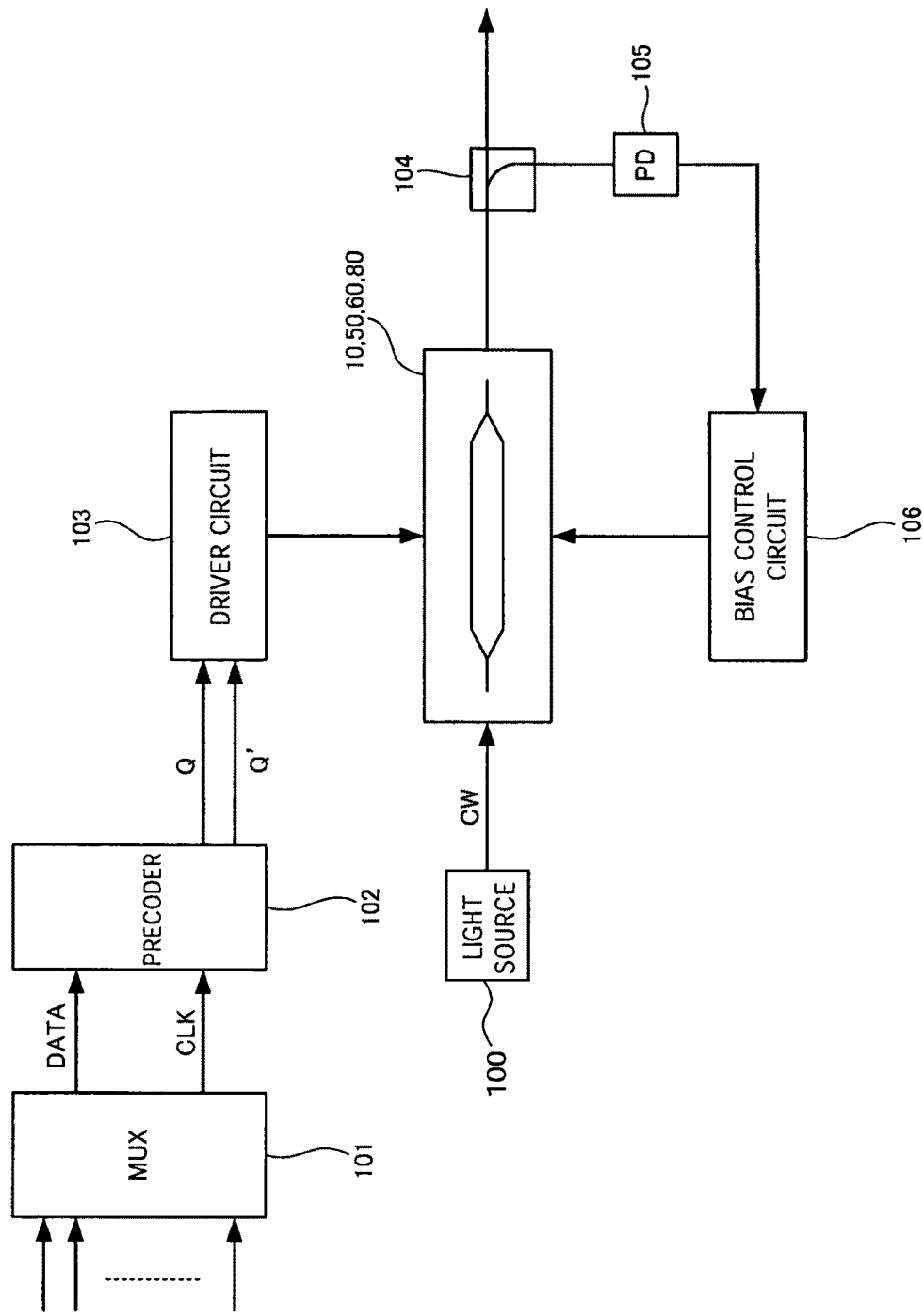
FIG. 9 is a block diagram illustrating a configuration example of an optical modulator that uses an optical waveguide device.
Figure 10:
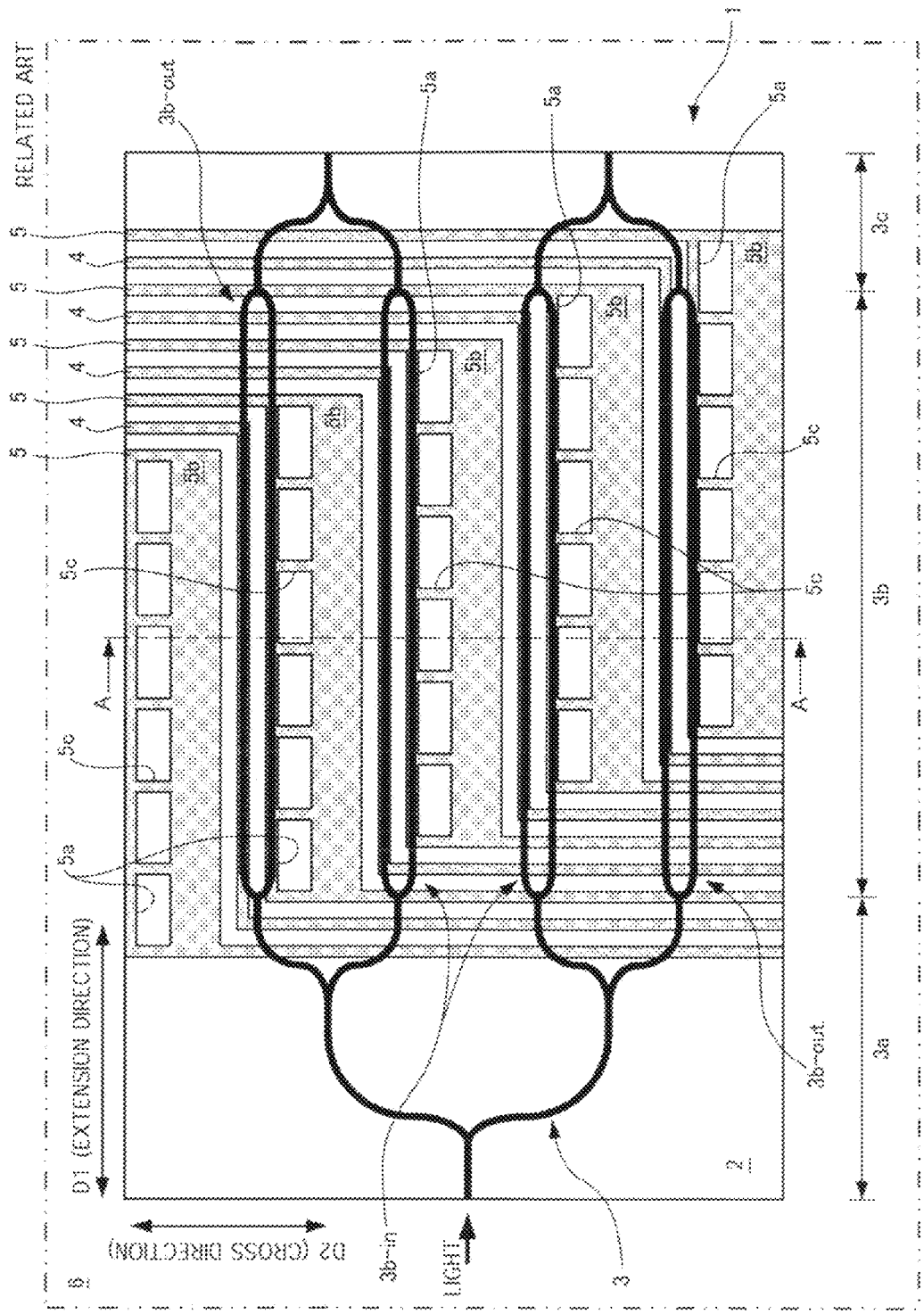
FIG. 10 is a plan view of an optical waveguide device according to a background art.
Figure 11:
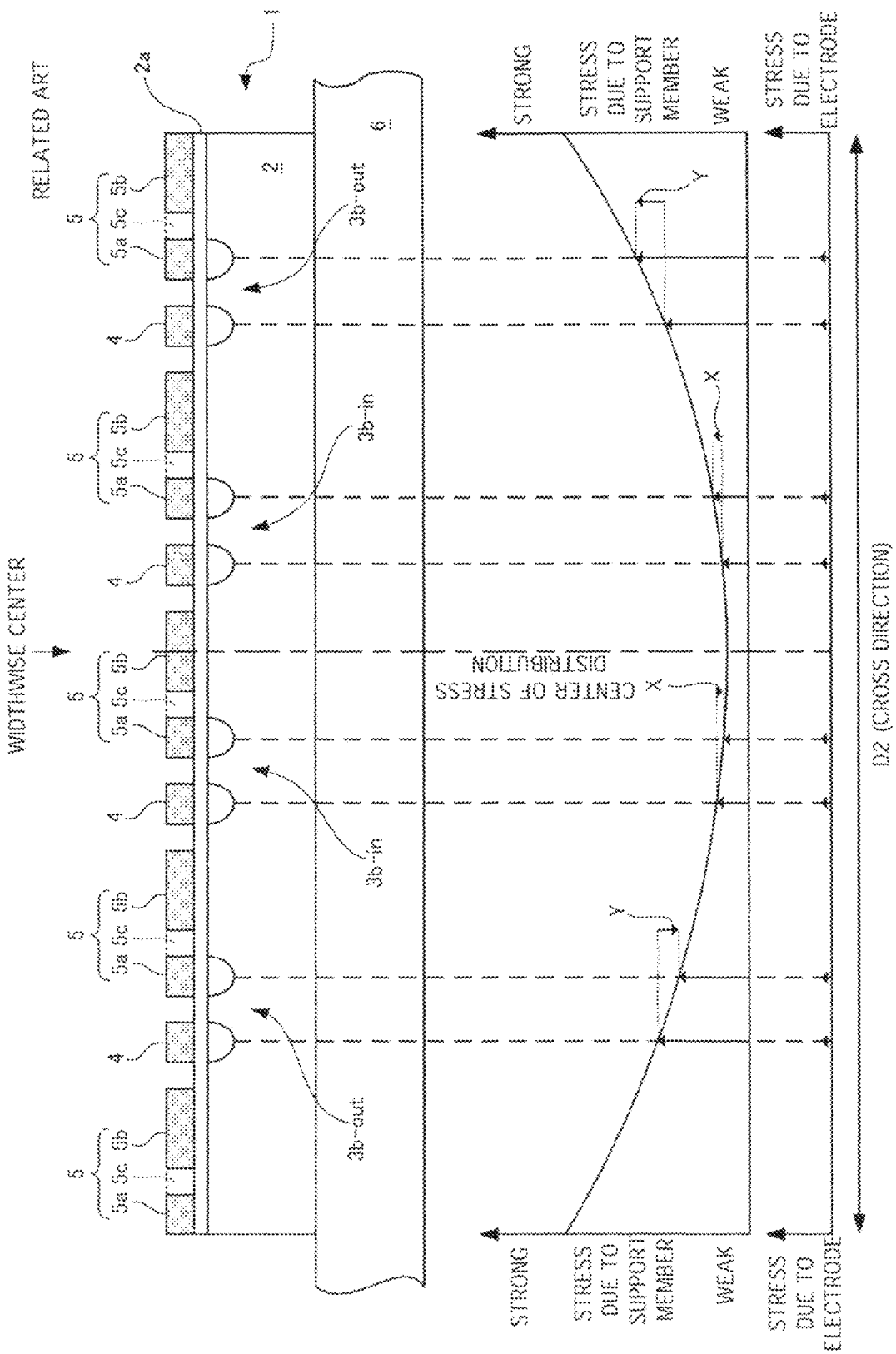
FIG. 11 is a cross-section along line A-A in FIG. 8.

The optical waveguide device according to the above-mentioned respective embodiments may be used as a Mach-Zehnder type optical modulator in a transmitter in an optical communication system as one example. FIG. 9 is a block diagram illustrating an incorporation example thereof.

In a transmitter in FIG. 9, continuous light CW output from a light source 100 in which the wavelength and output level are variable, is input to the input waveguide section 21, 71, 91 of the optical waveguide device 10, 50, 60, 80 used as the Mach-Zehnder type optical modulator. A multiplex circuit (MUX) 101 multiplexes a plurality of data signals provided from outside to generate a data signal DATA having a high bit rate, and generates a clock signal CLK having a frequency corresponding to the bit rate of the data signal DATA. A precoder 102 performs an encoding process corresponding to a required optical modulation system by using the data signal DATA from the multiplex circuit 101, to generate a modulation signal Q corresponding to the data and an inversion signal Q' thereof and provides the signals to a driver circuit 103.

The signal electrode 24, 74, 94 and the ground electrode 25, 75, 95 of the optical waveguide device 10, 50, 60, and 80 are terminated via the resistor to form a traveling-wave electrode. When a drive signal output from the driver circuit 103, which is a high-frequency electric signal corresponding to data, is applied to the signal electrode 24, 74, 94 of the optical waveguide device 10, 50, 60, 80, optical modulation according to the data is executed in the optical waveguide device 10, 50, 60, and 80.

A part of an optical signal output from the optical waveguide device 10, 50, 60, 80 is branched as monitor light in an optical coupler 104, and the branched monitor light is detected by an optical detector 105. An electric signal as a detection result by the optical detector 105, is input to a bias control circuit 106. The bias control circuit 106 then adjusts a bias voltage based on the detection result of the monitor light to optimize the operating point of the optical waveguide device 10, 50, 60, 80.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An optical waveguide device comprising:
   a substrate having an electro-optic effect, which is placed above a support member;
   an optical waveguide formed in the substrate, extending in a length direction of the substrate; and
   an electrode formed above the substrate for causing an electric field to act on the optical waveguide, wherein
   the optical waveguide has; at least one input waveguide section into which light is input, two or more waveguide sections each including a pair of waveguides in which light input to the input waveguide section is branched and propagated, and at least one output waveguide section that combines the branched light having propagated in the waveguide section,
   the electrode includes, for each of the waveguide sections, a signal electrode having a portion overlapping on one of the pair of waveguides, and a ground electrode having a portion overlapping on the other of the pair of waveguides,
   the ground electrode has a portion divided into a narrow portion overlapping on the waveguide and a wide portion having a wider width than the narrow portion, in a cross direction intersecting an extension direction of the waveguide sections, and the narrow portion and the wide portion are connected by one or more bridge portions,
   and a shape of the one or more bridge portions of the ground electrode is different between the ground electrodes.

2. An optical waveguide device according to claim 1, wherein
   the shape of the one or more bridge portions of the ground electrode is different according to a distance from a center of stress distribution of a stress applied from the support member to the substrate in the cross direction.

3. An optical waveguide device according to claim 2, wherein
   in the ground electrode the narrow portion overlaps on the waveguide placed on a side closer to the center of stress distribution.

4. An optical waveguide device according to claim 3, wherein
   the one or more bridge portions of the ground electrode farther from the center of stress distribution are formed larger than the one or more bridge portions of the ground electrode closer to the center of stress distribution.

5. An optical waveguide device according to claim 4, wherein
   a width of the one or more bridge portions of the ground electrode farther from the center of stress distribution is formed wider than a width of the one or more bridge portions of the ground electrode closer to the center of stress distribution.

6. An optical waveguide device according to claim 3, wherein
   a space between the narrow portion and the wide portion in the ground electrode farther from the center of stress distribution, is narrower than a space between the narrow portion and the wide portion in the ground electrode closer to the center of stress distribution.

7. An optical waveguide device according to claim 3, wherein
   the ground electrode farther from the center of stress distribution is formed thicker than the ground electrode closer to the center of stress distribution.

8. An optical waveguide device according to claim 7, wherein
   the one or more bridge portions and the wide portion of the ground electrode farther from the center of stress distribution are formed thicker than the one or more bridge portions and the wide portion of the ground electrode closer to the center of stress distribution.

9. An optical waveguide device according to claim 1, wherein
   one or more grooves are formed in the substrate along a side of the waveguide of the waveguide section,
   and the ground electrode is formed so as to fill the groove positioned beneath the ground electrode.

10. An optical waveguide device according to claim 9, wherein
    the grooves are respectively formed on both sides of the each waveguide of the each waveguide section,
    and a shape of the groove is different according to a formation position of the grooves in the cross direction.

11. An optical waveguide device according to claim 10, wherein
    a width of the groove is different according to a formation position of the grooves in the cross direction.

12. An optical waveguide device according to claim 10, wherein
    a depth of the groove is different according to a formation position of the grooves in the cross direction.

13. An optical waveguide device according to claim 10, wherein
    a length of the groove is different according to a formation position of the grooves in the cross direction.

14. An optical waveguide device according to claim 10, wherein
    the each waveguide of the waveguide sections is formed in a ridge portion formed in a position sandwiched by the grooves in the substrate,
    and a width of the ridge portion is different according to a formation position of the ridge portion in the cross direction.

15. An optical waveguide device according to claim 10, wherein
    the grooves are arranged symmetrically with the signal electrode as an axis of symmetry, in the cross direction.

16. A Mach-Zehnder type optical modulator that has an optical waveguide device comprising: a substrate having an electro-optic effect, which is placed above a support member; an optical waveguide formed in the substrate, extending in a length direction of the substrate; and an electrode formed above the substrate for causing an electric field to act on the optical waveguide, wherein the optical waveguide of the optical waveguide device has; at least one input waveguide section into which light is input, two or more waveguide sections each including a pair of waveguides in which light input to the input waveguide section is branched and propagated, and at least one output waveguide section that combines the branched light having propagated in the waveguide section, the electrode of the optical waveguide device includes, for each of the waveguide sections, a signal electrode having a portion overlapping on one of the pair of waveguides, and a ground electrode having a portion overlapping on the other of the pair of waveguides, the ground electrode has a portion divided into a narrow portion overlapping on the waveguide and a wide portion having a wider width than the narrow portion, in a cross direction intersecting an extension direction of the waveguide sections, and moreover the narrow portion and the wide portion are connected by one or more bridge portions, and a shape of the one or more bridge portions is different between the ground electrodes, and one end of the signal electrode of the optical waveguide device is grounded via a resistor and terminated, and a high-frequency electric signal according to a data signal is applied to the other end of the signal electrode.

17. An optical waveguide device comprising:
a substrate having an electro-optic effect, which is placed above a support member;
an optical waveguide formed in the substrate, extending in a length direction of the substrate;
a traveling-wave electrode formed above the substrate for causing an electric field due to a high-frequency electric signal to act on the optical waveguide; and
an operating-point adjusting electrode formed above the substrate, to which a bias voltage for adjusting an operating point of the optical waveguide is applied, wherein
the optical waveguide has; at least one input waveguide section into which light is input, two or more waveguide sections each including a pair of waveguides in which light input to the input waveguide section is branched and propagated, and at least one output waveguide section that combines the branched light having propagated in the waveguide section,
the operating-point adjusting electrode includes, for the each waveguide section, a bias electrode having a portion overlapping on one of the pair of waveguides, and a ground electrode having a portion overlapping on an other of the pair of waveguides,
the ground electrode has a portion divided into a narrow portion overlapping on the waveguide and a wide portion having a wider width than the narrow portion, in a cross direction intersecting an extension direction of the waveguide sections, and the narrow portion and the wide portion are connected by one or more bridge portions,
and a shape of one or more bridge portions of the ground electrode is different between the ground electrodes.

18. A Mach-Zehnder type optical modulator that has an optical waveguide device comprising: a substrate having an electro-optic effect, which is placed above a support member; an optical waveguide formed in the substrate, extending in a length direction of the substrate; a travelling-wave electrode formed above the substrate for causing an electric field due to a high frequency electric signal to act on the optical waveguide; and an operating-point adjusting electrode formed above the substrate, to which a bias voltage for adjusting an operating point of the optical waveguide is applied, wherein the optical waveguide of the optical waveguide device has; at least one input waveguide section into which light is input, two or more waveguide sections each including a pair of waveguides in which light input to the input waveguide section is branched and propagated, and at least one output waveguide section that combines the branched light having propagated in the waveguide section, the operating-point adjusting electrode of the optical waveguide device includes, for the each waveguide section, a bias electrode having a portion overlapping on one of the pair of waveguides, and a ground electrode having a portion overlapping on an other of the pair of waveguides, the ground electrode has a portion divided into a narrow portion overlapping on the waveguide and a wide portion having a wider width than the narrow portion, in a cross direction intersecting an extension direction of the waveguide section, and moreover the narrow portion and the wide portion are connected by one or more bridge portions, and a shape of the one or more bridge portions of the ground electrode is different between the ground electrodes, and a high-frequency electric signal according to a data signal is applied to the travelling-wave electrode of the optical waveguide device.

* * * * *